D. SLAUGHTER.
Meat Cutter.
No. 80,675.
Patented Aug. 4, 1868.
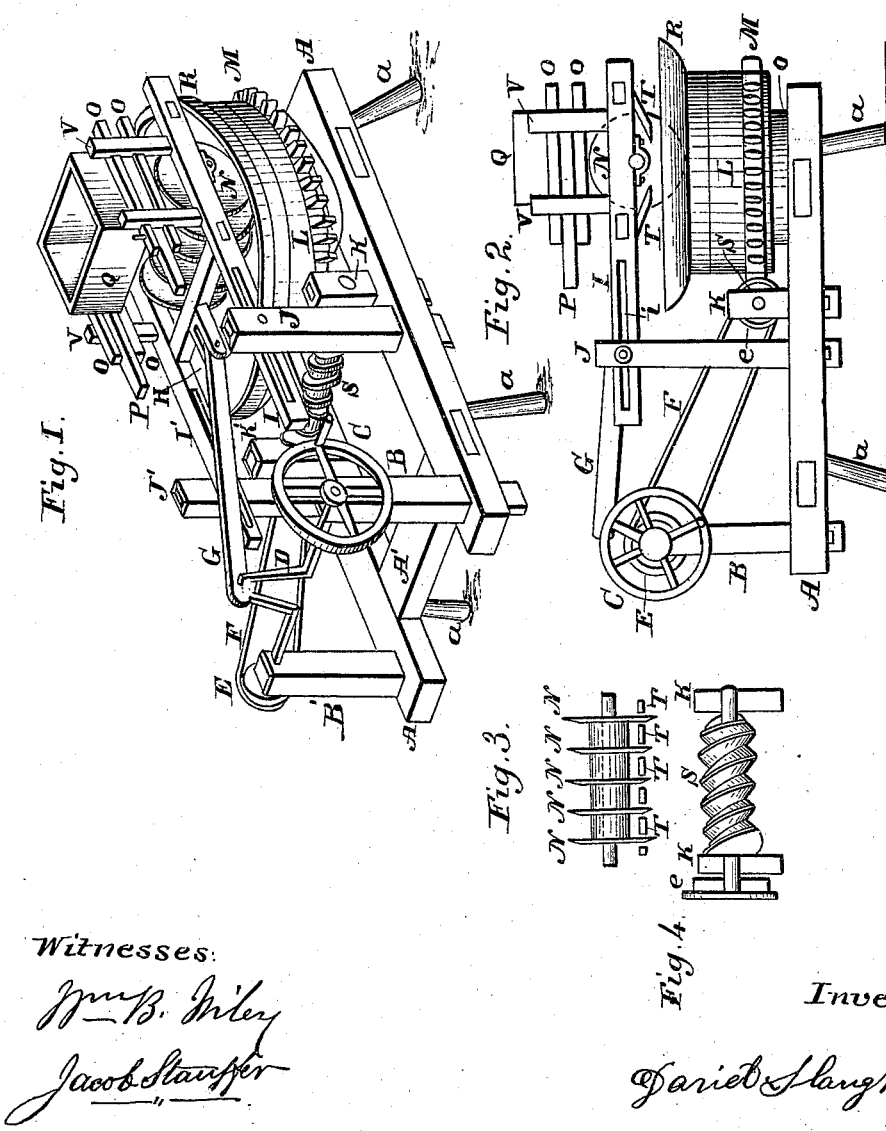
Witnesses:
Inventor:

United States Patent Office.

DAVID SLAUGHTER, OF WEST HEMPFIELD TOWNSHIP, PENNSYLVANIA.

Letters Patent No. 80,675, dated August 4, 1868.

IMPROVED MEAT-CUTTER.

The Schedule referred to in these Letters Patent and making part of the same.

TO ALL WHOM IT MAY CONCERN:

Be it known that I, DAVID SLAUGHTER, of West Hempfield township, in the county of Lancaster, and State of Pennsylvania, have invented a new and improved Combination in a Machine for Cutting or Mincing Meat; and I do hereby declare the following to be a full and exact description of the construction and operation of the same, reference being had to the accompanying drawings, making a part of this specification, in which—

Figure 1 is a perspective view of the machine.

Figure 2, a side elevation.

Figure 3, the circular cutters and intermediate cleaners.

Figure 4, the screw-shaft.

The nature of my invention consists in providing a series of circular knives, attached to a central axis revolving on side bearings, and made to traverse to and fro on a revolving block, by means of a crank and screw-gearing, for mincing or cutting sausage-meat, with an adjustable bearing or weighted pressure on the knives.

To enable others skilled in the art to make and use my invention, I will proceed to describe its construction and operation.

Fig. 1 shows a frame, A A', supported on four legs, a. This supports two vertical posts, B B', in front for bearings for a crank-shaft, D. This shaft has a handled fly-wheel, C, on one end, and strap-pulley, E, on the other, which pulley has a strap, F, and connects over a pulley, e, on the end of the screw-shaft S, fig. 4, which latter has its bearing in the uprights K K'. The posts or guides J J' have a lug or friction-roller on the inner side for the slotted arms I I', on the knife-car or combined framework. This car is connected centrally at H with the crank D, by a connecting-rod, G. The slotted side-pieces I I' have a journal or bearing for the series of circular knives N, fig. 3, and are connected behind by cross-pieces Z Z', to which cleaners or guide-strips T are connected on the under side, inclined downwards along the blades, and separating between them. Four uprights, V, support a pair of horizontal bars, O, on opposite sides. A box, Q, with arms P on the side, projecting forward, is made adjustable between the fixed bars O. The box Q can be increased in weight to give any desired amount of pressure on the knives, which support the box and appliances, and rest upon a thick, round cutting-block L. This block has a rim, R, curved with the radius of the knives, to retain the meat on the block. This block has a central bearing on the rear cross-piece, and is provided with cogs M, near the base around the same. These cogs mesh into the endless screw-shaft S, and revolve the block by the action of the crank, which, at the same time, draws the car and knives back and forward over the revolving block, presenting the meat upon it, at constantly-varied angles and position, to the action of the knives.

The drawings clearly indicate the operation of the twofold motion. It will be noticed that the slotted arms I have their fulcrum on the roller only on the posts J, on which the arms slide also, and that the weighted box, by being slid further back, will increase the pressure of the knives by the same weight, and by this adjustability the pressure can be regulated to act over the front, centre, or rear of the knives or cutting-blades.

I am aware that revolving blocks are common, used with spring-choppers that cut down vertically with a loud clatter, and are harder to operate. I know also that all the parts, separately considered, are not new; but I am not aware that they were ever combined substantially in the manner and for the purpose herein set forth.

What I claim as my invention, and desire to secure by Letters Patent, is—

The arrangement of the circular knives N and weighted sliding car and box Q, with its slotted arms I I', in combination with a revolving block, L, and crank and screw-shaft D S, substantially in the manner and for the purpose specified.

DAVID SLAUGHTER.

Witnesses:
WM. B. WILEY,
JACOB STAUFFER.